(12) United States Patent (10) Patent No.: US 12,629,771 B2

Suzuki (45) Date of Patent: May 19, 2026

(54) TEACHING SYSTEM AND TEACHING METHOD FOR LASER MACHINING

(71) Applicant: FANUC CORPORATION, Yamanashi (JP)

(72) Inventor: Youhei Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 905 days.

(21) Appl. No.: 17/914,923

(22) PCT Filed: May 10, 2021

(86) PCT No.: PCT/JP2021/017629

§ 371 (c)(1),
(2) Date: Sep. 27, 2022

(87) PCT Pub. No.: WO2021/230178

PCT Pub. Date: Nov. 18, 2021

(65) Prior Publication Data

US 2023/0158602 A1 May 25, 2023

(30) Foreign Application Priority Data

May 15, 2020 (JP) ................................. 2020-085796

(51) Int. Cl.
B23K 26/08 (2014.01)
B23K 26/03 (2006.01)
(Continued)

(52) U.S. Cl.
CPC .......... B23K 26/032 (2013.01); B23K 26/044 (2015.10); B23K 26/0884 (2013.01);
(Continued)

(58) Field of Classification Search
CPC ........... G05B 2219/40613; G05B 19/42; B25J 9/1697; B23K 26/0884; B23K 26/21; B23K 26/044; B23K 26/032
(Continued)

(56) References Cited

U.S. PATENT DOCUMENTS 5,500,913 A * 3/1996 Allen ................... G02B 6/2852
385/27
11,612,963 B2 * 3/2023 Nakagawa ............. B23Q 17/10
219/121.72
(Continued)

FOREIGN PATENT DOCUMENTS

CN 107127449 A 9/2017
CN 111112859 A 5/2020
(Continued)

OTHER PUBLICATIONS

International Search Report mailed Jun. 22, 2021 in corresponding International Application No. PCT/JP2021/017629; 5 pages (w/ partial Machine translation).

*Primary Examiner* — Jimmy Chou
(74) *Attorney, Agent, or Firm* — Maier & Maier, PLLC

(57) ABSTRACT

A teaching system includes a sensor that detects the intensity of reflected light and at least one processor configured to: receive inputs and perform a generation of teaching data that enables laser machining at all machining points by using a laser beam having an angle larger than or equal to the minimum value and smaller than the maximum value; determine whether or not intensities of reflected light at all the machining points include an intensity exceeding a predetermined threshold value; increase the minimum value at a corresponding machining point by a predetermined increment if the determination result indicates that the threshold value is exceeded; and repeat the generation of the teaching data using a most-recently adjusted minimum value, the determination, and adjustment of the minimum value until it is determined that the threshold value is not exceeded.

4 Claims, 13 Drawing Sheets

(51) Int. Cl.
　　B23K 26/044　　　(2014.01)
　　B23K 26/21　　　　(2014.01)
　　B25J 9/16　　　　　(2006.01)
　　G05B 19/42　　　　(2006.01)

(52) U.S. Cl.
　　CPC ............. B23K 26/21 (2015.10); B25J 9/1697
　　　　(2013.01); G05B 19/42 (2013.01); G05B
　　　　　　　　　　　　2219/40613 (2013.01)

(58) Field of Classification Search
　　USPC ...................................................... 219/121.83
　　See application file for complete search history.

(56)　　　　　　　References Cited

U.S. PATENT DOCUMENTS

| | | | | |
|---|---|---|---|---|
| 2007/0075054 A1* | 4/2007 | Nakamura | ............. | B23K 26/04 |
| | | | | 219/121.61 |
| 2008/0124816 A1* | 5/2008 | Bruland | ............... | B23K 26/082 |
| | | | | 257/E23.15 |
| 2013/0048617 A1* | 2/2013 | Morikazu | ............. | B23K 26/032 |
| | | | | 219/121.7 |
| 2014/0263212 A1* | 9/2014 | Zhang | ................ | B23K 26/0876 |
| | | | | 219/121.68 |
| 2020/0070281 A1* | 3/2020 | Takeda | ............... | B23K 26/0884 |
| 2020/0070282 A1* | 3/2020 | Takeda | ............... | G05B 13/0265 |
| 2020/0130107 A1* | 4/2020 | Mochizuki | .......... | B23K 26/702 |

FOREIGN PATENT DOCUMENTS

| | | | | | |
|---|---|---|---|---|---|
| DE | 102017010799 A1 | | 5/2018 | | |
| DE | 102017011361 A1 | | 6/2018 | | |
| DE | 102018102333 A1 | | 8/2018 | | |
| EP | 1769878 A1 | | 4/2007 | | |
| EP | 2862678 A2 | | 4/2015 | | |
| JP | S62289387 A | | 12/1987 | | |
| JP | 2001-340979 A | | 12/2001 | | |
| JP | 2007-098417 A | | 4/2007 | | |
| JP | 2010-260095 A | | 11/2010 | | |
| JP | 2012-135781 A | | 7/2012 | | |
| JP | 2014046317 A | | 3/2014 | | |
| JP | 2015-199127 A | | 11/2015 | | |
| JP | 2020019024 A | * | 2/2020 | ........... | B23K 26/035 |
| JP | 2020032456 A | * | 3/2020 | ......... | B23K 26/0884 |
| JP | 2020035404 A | * | 3/2020 | ........... | B25J 9/1671 |

* cited by examiner

TEACHING SYSTEM AND TEACHING METHOD FOR LASER MACHINING

CROSS-REFERENCE TO RELATED APPLICATIONS

This application is a national phase of International Patent Application No. PCT/JP2021/017629, filed on May 10, 2021, which claims priority to Japanese Patent Application No. 2020-085796, filed on May 15, 2020, the entire contents of which are incorporated herein by reference.

FIELD

The present disclosure relates to teaching systems and teaching methods for laser machining.

BACKGROUND

A known teaching device automatically generates teaching data in a laser machining system that is equipped with a machining head having a galvano scanner at the distal end of an arm of a robot and that performs machining, such as welding, on a workpiece (for example, see Japanese Unexamined Patent Application, Publication No. 2020-035404).

SUMMARY

An aspect of the present disclosure provides a teaching system for laser machining. The teaching system teaches an operation of a robot equipped with a machining head that outputs a laser beam and an operation of the machining head. The teaching system includes a sensor that detects an intensity of reflected light of the laser beam returning to the machining head from a surface of an object to be machined, and at least one processor. The processor is configured to: receive inputs of a minimum value and a maximum value of an irradiation angle, serving as an angle formed between a normal to the surface of the object to be machined at each of machining points and the laser beam output from the machining head, and coordinates of the machining points and perform a generation of teaching data that enables laser machining at all the machining points by using the laser beam having the irradiation angle larger than or equal to the minimum value and smaller than the maximum value; perform a determination to determine whether or not intensities of the reflected light detected by the sensor at all the machining points include an intensity exceeding a predetermined threshold value when a controller of the robot is caused to execute an operation program including the teaching data by using the laser beam set to an intensity at which the intensity of the reflected light when the irradiation angle is set to the minimum value is smaller than or equal to a permissible value; perform an adjustment, if it is determined that the reflected light having the intensity exceeding the threshold value exists, to increase the minimum value at a corresponding machining point by a predetermined increment; and repeat the generation of the teaching data using a most-recently adjusted minimum value, the determination, and the adjustment of the minimum value until it is determined that the reflected light having the intensity exceeding the threshold value does not exist.

DETAILED DESCRIPTION OF THE EMBODIMENTS

A teaching system 100 and a teaching method for laser machining according to an embodiment of the present disclosure will be described below with reference to the drawings.

Figure 1:
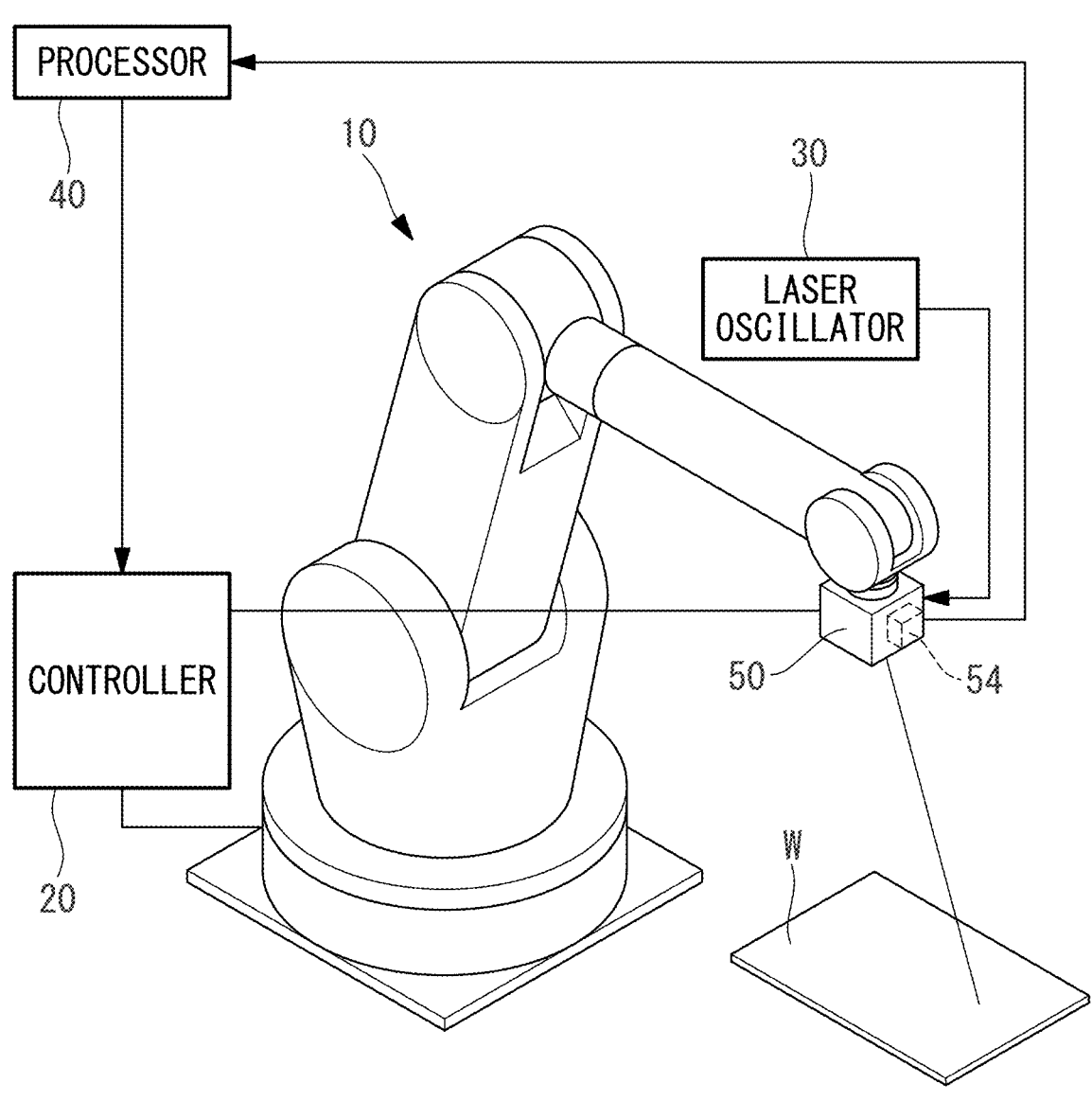
FIG. 1 is an overall configuration diagram illustrating a teaching system according to an embodiment of the present disclosure.

As shown in FIG. 1, the teaching system 100 according to this embodiment is a system that generates teaching data about the operation of a robot 10 and the operation of a machining head 50 attached to the distal end of the robot 10 for irradiating a workpiece (i.e., an object to be machined) W with a laser beam from the machining head 50 and executing laser welding (i.e., laser machining).

The robot 10 is, for example, a vertical articulated type robot. The machining head 50 includes a galvano scanner (simply referred to as "scanner" hereinafter) 51 and can output a laser beam at a desired angle within a predetermined angular range.

The scanner 51 has a function for scanning a laser beam, transmitted from a laser oscillator 30 via an optical fiber, in two-dimensional directions orthogonal to an optical axis by driving a half mirror 52, and also has a function for moving a focal position along the optical axis by driving a focusing lens 53 along the optical axis.

As shown in FIG. 1, the teaching system 100 includes an optical sensor (sensor) 54 provided in the machining head 50 and at least one processor 40.

Figure 2:
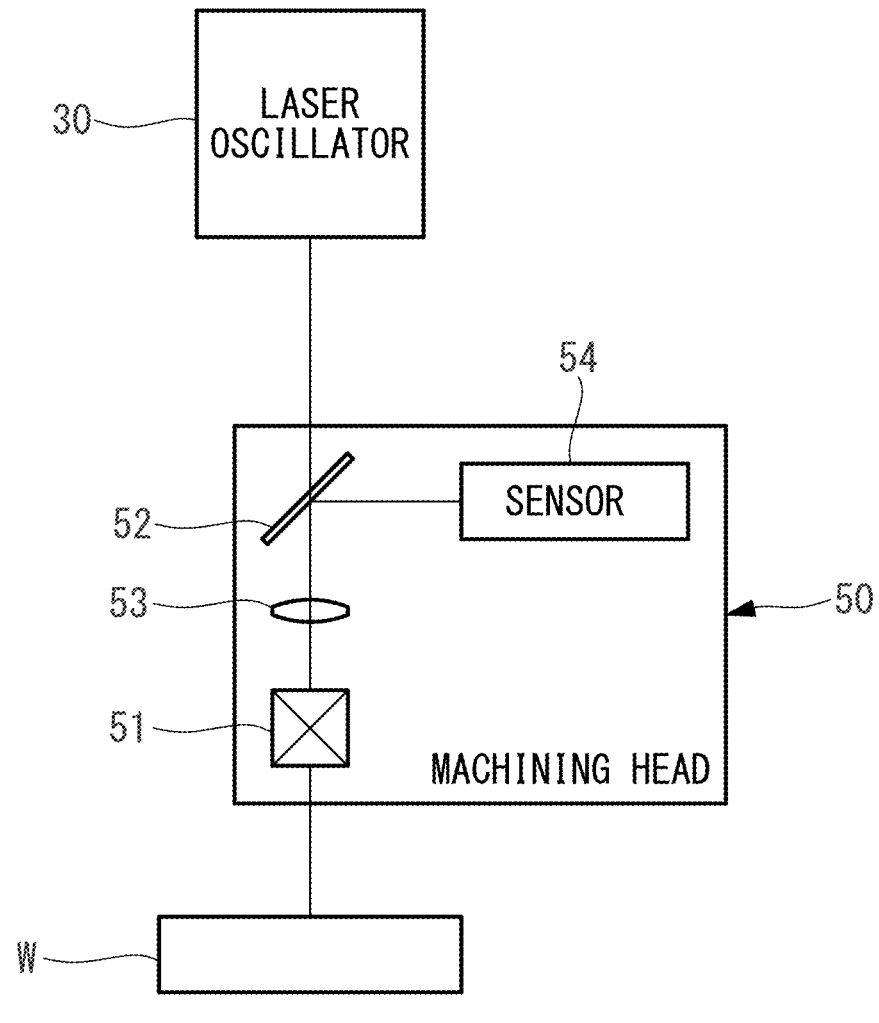
FIG. 2 illustrates the configuration of a machining head including an optical sensor.

As shown in FIG. 2, in the optical path between the laser oscillator 30 connected to the machining head 50 and the scanner 51, the optical sensor 54 detects the intensity of reflected light that is diverged by the half mirror 52 while returning from the surface of the workpiece W via the scanner 51.

Figure 3:
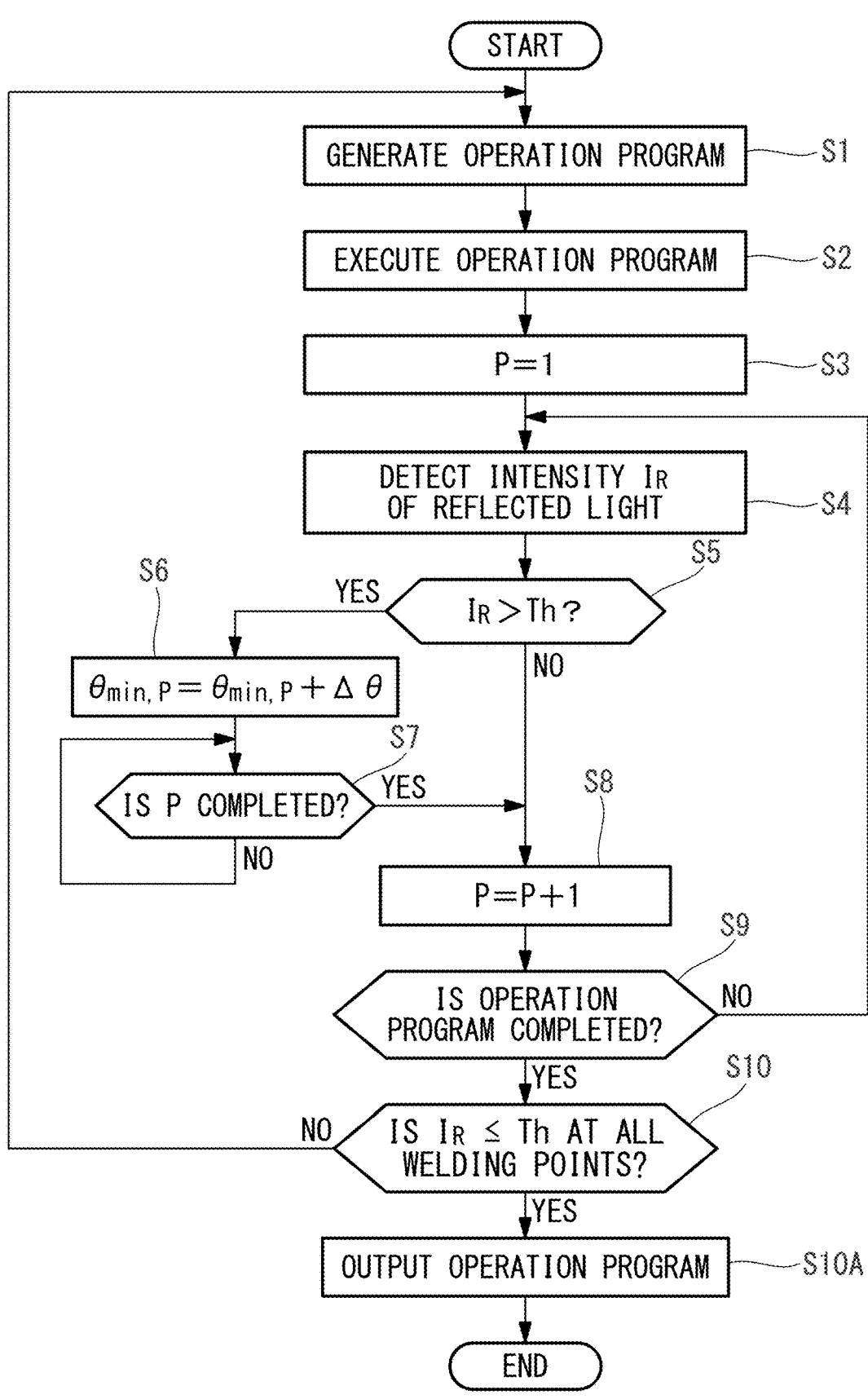
FIG. 3 is a flowchart illustrating a teaching method that uses the teaching system in FIG. 1.

As shown in FIG. 3, in the teaching method according to this embodiment, the processor 40 generates an operation program (i.e., teaching data) (step S1) and causes a controller 20 to execute the generated operation program (step S2).

When the operation program is executed, a welding point P is reset such that P=1 (step S3).

During the execution of the operation program, the optical sensor 54 detects the intensity $I_R$ of the reflected light (step S4), and the processor 40 determines whether or not the detected intensity $I_R$ of the reflected light exceeds a predetermined threshold value Th (step S5). Based on the determination result, the processor 40 adjusts a minimum value $\theta_{min,P}$ of an irradiation angle for each welding point (step S6).

The generation of the operation program (step S1) by the processor 40 involves inputting the minimum value $\theta_{min,P}$ and a maximum value $\theta_{max,P}$ of the irradiation angle of a laser beam at each welding point, as well as the position (i.e., coordinates) of the welding point (i.e., machining point). Then, teaching data that enables welding at all the welding points is generated by using a laser beam with an irradiation angle larger than or equal to the minimum value $\theta_{min,P}$ and smaller than the maximum value $\theta_{max,P}$. The irradiation angle is an angle formed between the normal to the surface of the workpiece W at each welding point and the laser beam output from the machining head 50.

An initial value for the minimum value $\theta_{min,P}$ of the irradiation angle of the laser beam is set such that, for example, $\theta_{min,P}=0$ at all the welding points P.

The maximum value $\theta_{max,P}$ of the irradiation angle of the laser beam is set to an angle that allows welding to be executed properly at all the welding points P.

Figure 4:
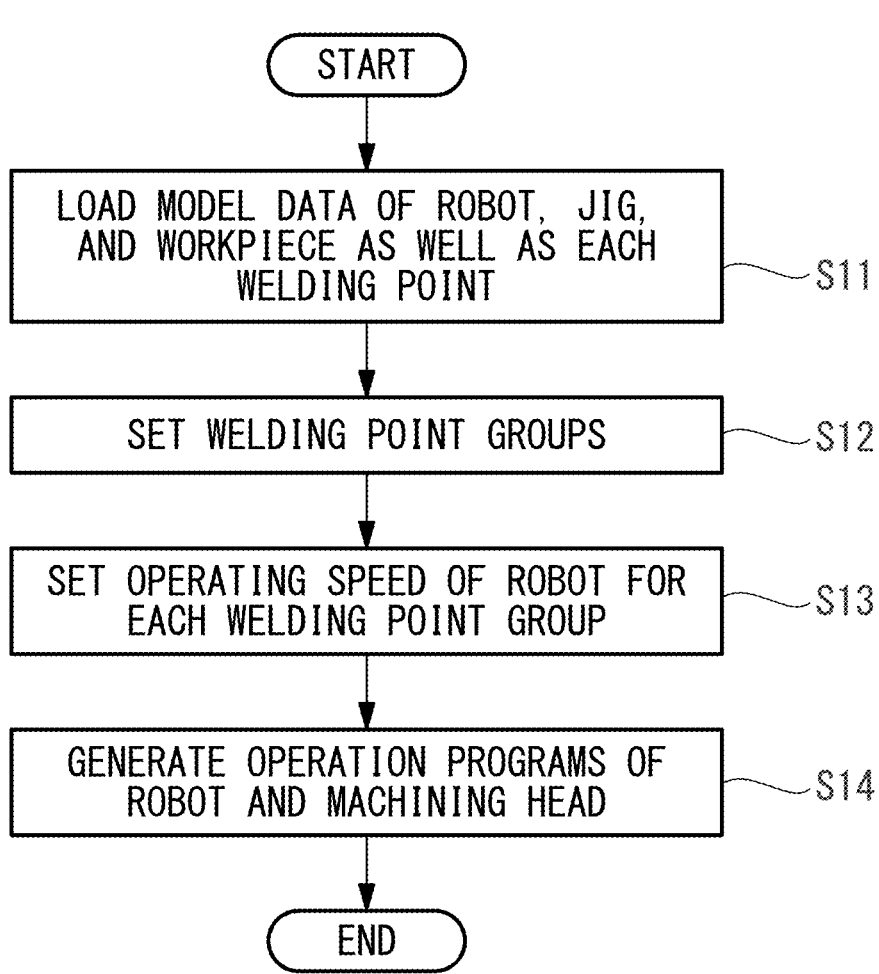
FIG. 4 is a flowchart illustrating an operation-program generating process in the flowchart in FIG. 3.

In detail, the operation program is generated by the processor 40 in accordance with a flowchart shown in FIG. 4.

First, in addition to the irradiation angle and the welding points mentioned above, the processor 40 loads various types of data required for generating the operation program. Such various types of data include model data of the robot 10, a jig, and the workpiece W, as well as a welding period and a welding pattern at each welding point (step S11).

The various types of data may be stored in advance in a storage device, such as a memory, or may be input via an operation unit. Alternatively, the various types of data may be input from an external device via a network.

Subsequently, a welding-point-group setting process is performed (step S12). Grouping is performed such that the following criteria are satisfied.

(1) The distance between the path of the robot 10 extending through a welding point group and each welding point is within the operating range (i.e., scanning range) of the machining head 50.

(2) If line segments respectively having lengths corresponding to welding periods along a path of the robot 10 are defined at the position of the base of a perpendicular line extending from each welding point to the path, the degree of denseness of the line segments corresponding to the welding periods on the path is uniform.

Figure 5:
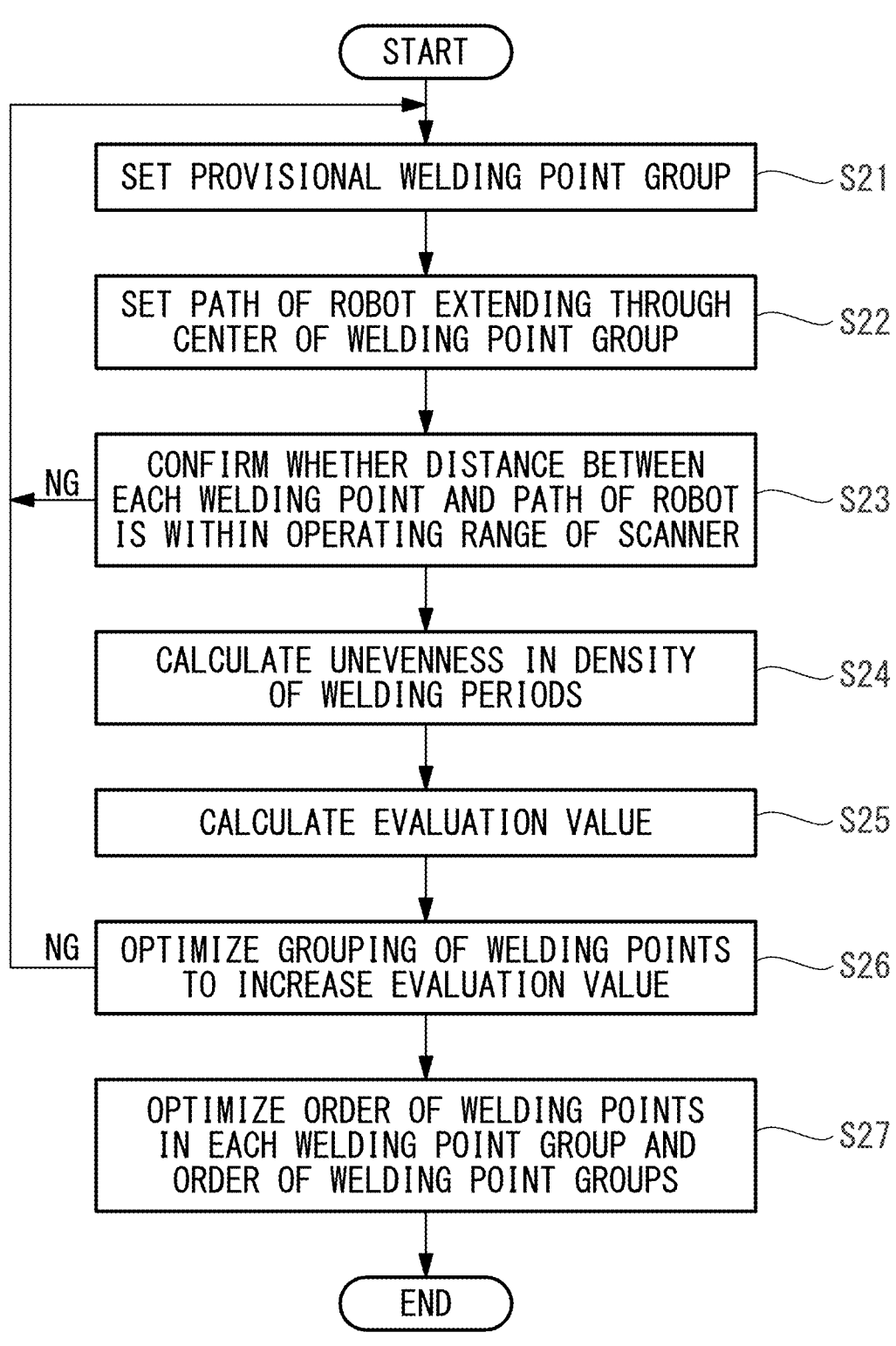
FIG. 5 is a flowchart illustrating a welding-point-group setting process in the flowchart in FIG. 4.
Figure 7:
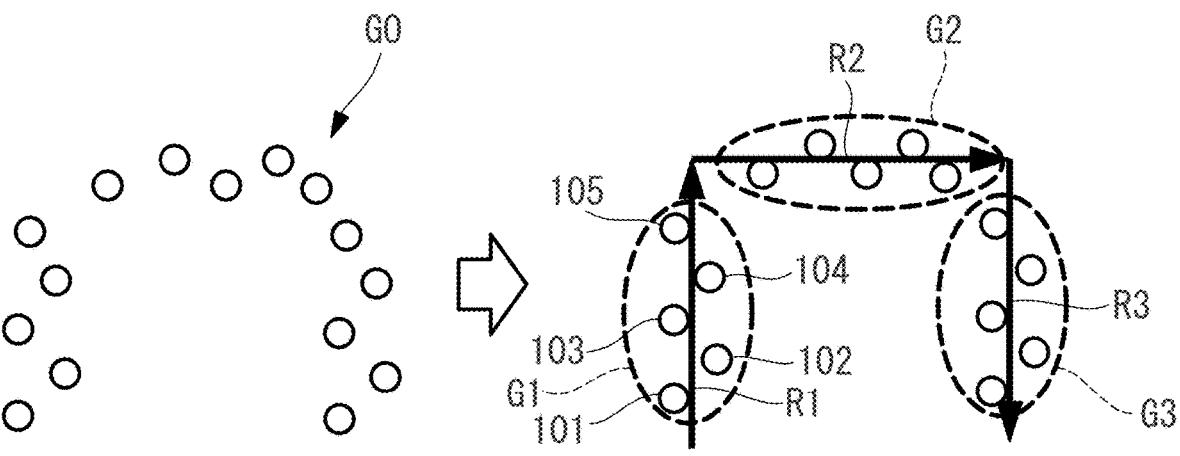
FIG. 7 illustrates grouping of a welding point group.

FIG. 5 is a flowchart specifically illustrating the welding-point-group setting process to be performed in step S12 in FIG. 4. The following description relates to an example where grouping is performed with respect to a welding point group G0 shown at the left side in FIG. 7.

First, the welding point group G0 is grouped into provisional welding point groups (step S21). Each group defines a plurality of welding points where welding is performed while the robot 10 operates in response to a single operation command. In each group, the robot 10 operates in response to a single operation command, while the machining head 50 performs scanning to weld each of the welding points belonging to the group.

In response to a single operation command, the robot 10 moves linearly at a constant speed. It is assumed here that, for example, the welding point group G0 is provisionally grouped into three welding point groups G1 to G3 shown at the right side in FIG. 7.

Then, for each of the welding point groups G1 to G3, a path of the robot 10 extending through the center of the welding point group is set (step S22). A line extending through the center of each welding point group is determined by using, for example, the least squares method.

With regard to the welding point group G1 as an example, a path R1 is obtained as a line where the sum of squares of the distances from welding points 101 to 105 to the path R1 is at a minimum. Because the welding points are located in a three-dimensional space, the welding points 101 to 105 are actually distributed in a three-dimensional space. Thus, the aforementioned path is set by defining a plane that extends through an averaged position of the welding points and assuming that the welding points 101 to 105 exist at positions where the welding points 101 to 105 are projected onto the plane.

The plane extending through the averaged position of the welding points can be obtained by using the least squares method (or by using Newell's algorithm). It is assumed that paths R1, R2, and R3 are set as paths of the welding point groups G1 to G3 as a result of step S22. Each of the paths R1, R2, and R3 may be set as a path along which the base of a perpendicular line extending from the laser-beam irradiation position to the plane that defines the corresponding welding point group G1, G2, or G3 moves on the plane.

Figure 8:
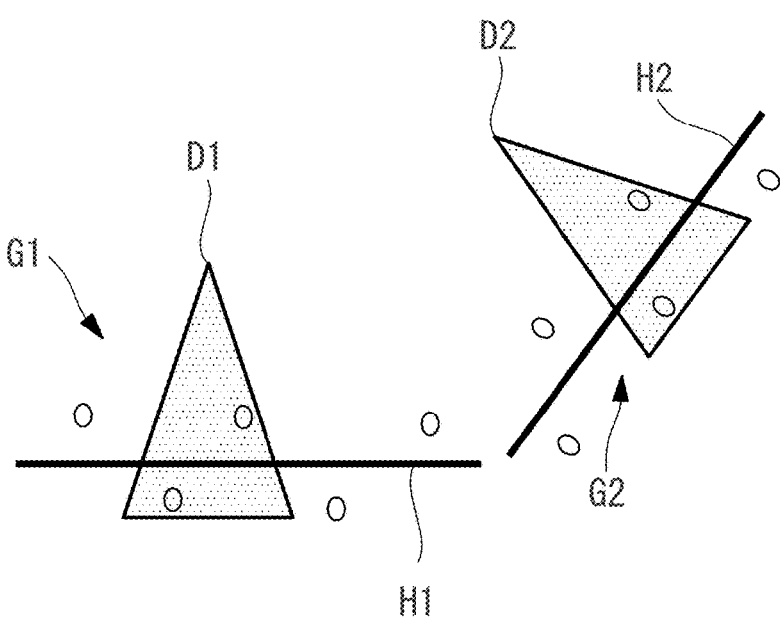
FIG. 8 illustrates an example of a plane that defines each welding point group.

The plane on which the welding points 101 to 105 of each of the welding point groups R1, R2, and R3 are projected may be defined as a plane inclined relative to the horizontal direction depending on the distribution state (the shape of a weld surface) of the welding points 101 to 105. For example, as shown in FIG. 8, a plane H1 that defines the welding point group G1 is preferably defined as a plane inclined relative to a plane H2 that defines the welding point group G2.

With the planes being set in this manner, the planes can be set in conformity to the distribution of the welding point groups. In FIG. 8, an example of the operating range of the machining head 50 set at each of laser-beam irradiation positions D1 and D2 is also shown. While the robot 10 is located on the path corresponding to the welding point group G2, the orientation of the robot 10 is controlled so that the machining head 50 is oriented toward the plane H2.

Subsequently, it is confirmed whether or not the welding points 101 to 105 are within the operating range of the machining head 50 for each of the welding point groups R1, R2, and R3 (step S23). For example, with regard to the welding point group G1, the confirmation in step S23 can be performed in accordance with whether or not the distance from each of the welding points 101 to 105 to the path R1 is within the operating range of the machining head 50. If there is a welding point outside the operating range of the machining head 50, the grouping is performed again from step S21.

Subsequently, the grouping is optimized based on the distribution of the welding points within each welding point group and the welding period at each welding point (step S24 to step S26). The optimization of the grouping will now be described based on an assumption with reference to a welding point group shown in FIG. 9.

Figure 9:
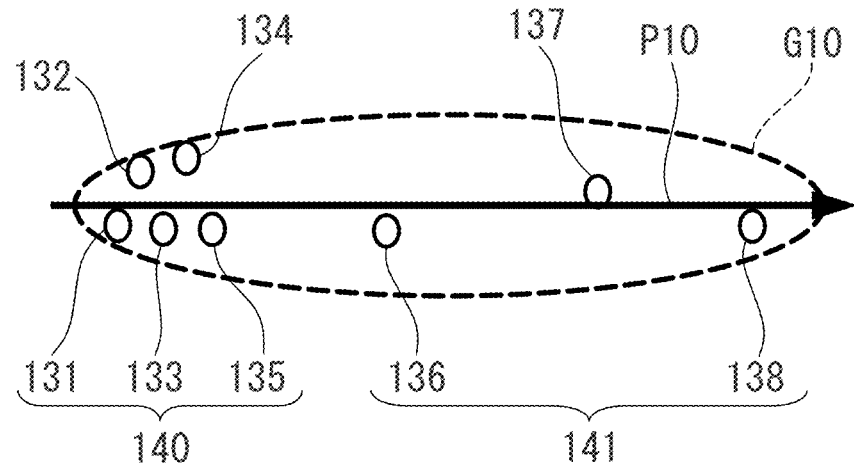
FIG. 9 is a diagram for explaining optimization of the grouping.

In the example in FIG. 9, welding points 131 to 138 are distributed within a single welding point group G10. A path P10 is set for the welding point group G10 in accordance with step S22.

As mentioned above, in the operation corresponding to a single operation command, the robot 10 operates at a constant speed. Thus, if the operating speed of the robot 10 is set to a low value such that the robot 10 can complete the welding process on all the welding points 131 to 135 in an area 140 where the welding points are densely distributed, the robot 10 would move at an undesirably low speed in an area 141 where the welding points are sparsely distributed.

Therefore, in this case, separating the welding point group G10 into a welding point group for the area 140 and a welding point group for the area 141 can increase the average speed of the robot 10. Specifically, it is preferable that the grouping be performed such that the welding points in each welding point group are uniformly distributed.

It is also necessarily to take into account that the welding period varies from welding point to welding point.

Figure 10:
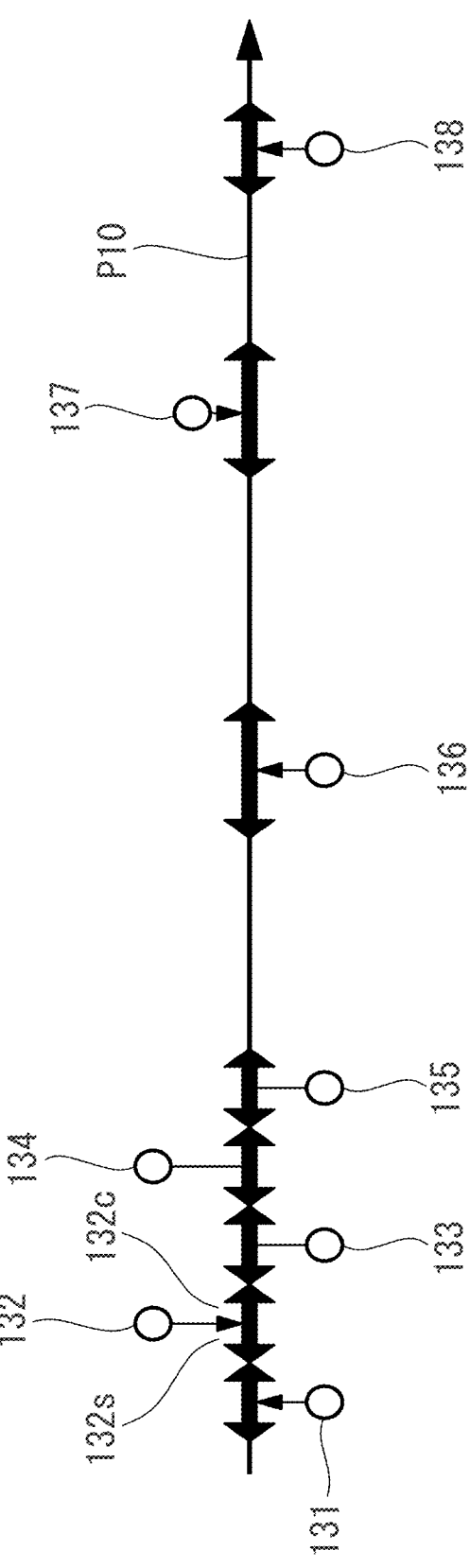
FIG. 10 illustrates an example of the degree of denseness of welding periods.

Therefore, line segments respectively having lengths corresponding to the welding periods at welding points 131 to 138 and having the position of the base of a perpendicular line extending from each of the welding points 131 to 138 to the path as the center are set on the path P10, as shown in FIG. 10. Since each of these line segments corresponds to the welding period at one welding point within a time period in which the robot 10 moves on the path P10, each line segment will be referred to as "welding period" hereinafter.

For example, in FIG. 10, a welding period 132$s$ in which a position 132$c$ of the base of a perpendicular line extending from the welding point 132 to the path P10 serves as the center is set. In FIG. 10, each welding period is indicated by a bold double-sided arrow for the sake of convenience.

First, the density (i.e., the degree of denseness) of the welding periods occupying the path P10 is calculated (step S24). In this case, the density of the welding periods can also be expressed as the degree of concentration of the welding periods.

Figure 11:
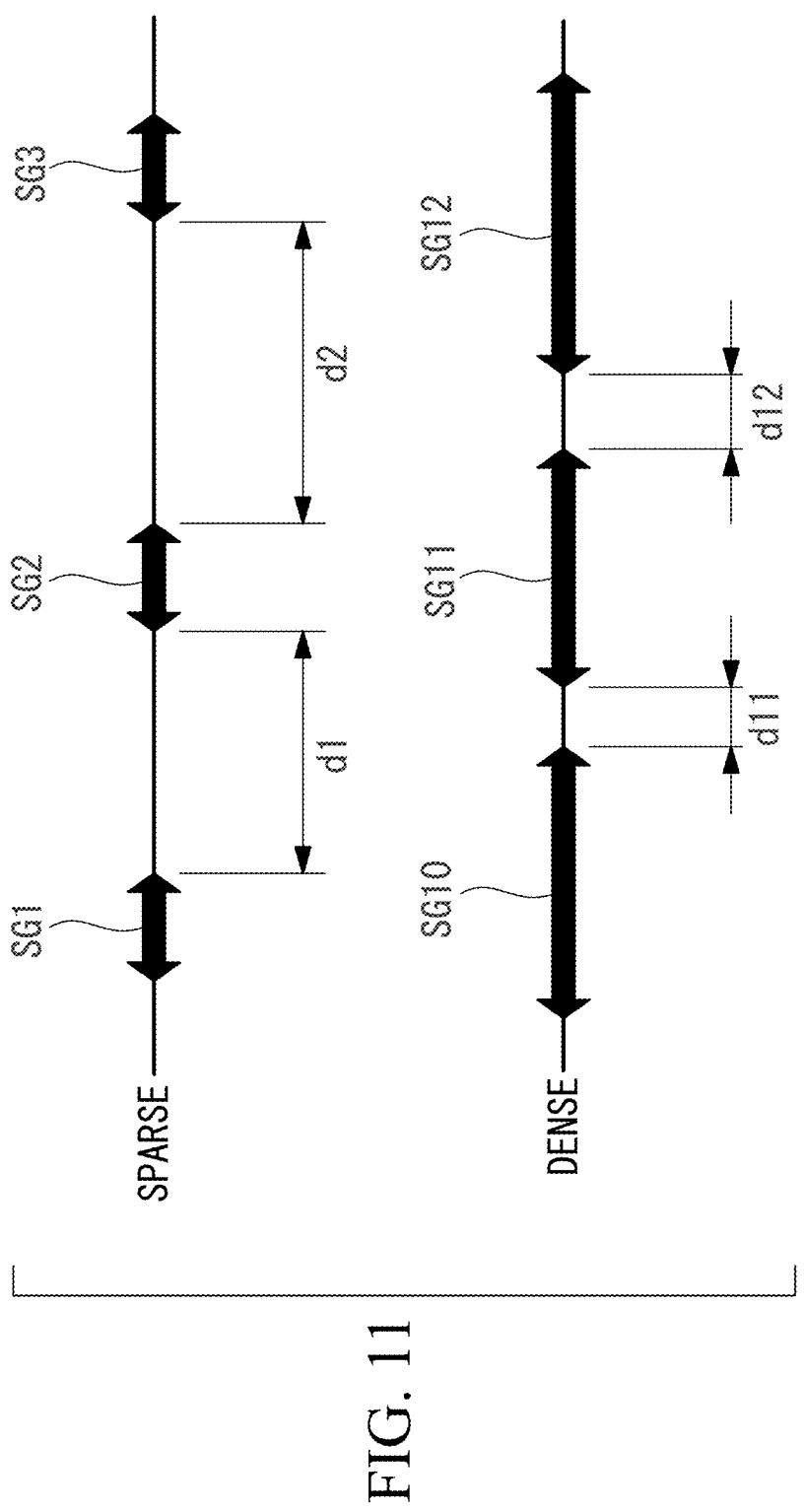
FIG. 11 is a diagram for explaining the degree of denseness of the welding periods.

For example, as shown in the upper part of FIG. 11, a state where welding periods SG1, SG2, and SG3 set on the path P10 are separated by long intervals d1 and d2 corresponds to a state where the density of the welding periods is low (i.e., a sparse state).

In contrast, as shown in the lower part of FIG. 11, a state where welding periods SG10, SG11, and SG12 are separated by short intervals d11 and d12 corresponds to a state where the density of the welding periods is high (i.e., a dense state). The state where the adjacent welding periods are separated by long intervals indicates that the speed of the robot 10 can be increased in areas corresponding to these welding periods on the path P10. In contrast, the state where the adjacent welding periods are separated by short intervals indicates that the speed of the robot 10 cannot be increased in areas corresponding to these welding periods on the path P10.

Therefore, unevenness in the density (i.e., unevenness in the dense and sparse states) of welding periods set on a path of a certain welding point group is evaluated, and the grouping is performed again if the unevenness in the density is high. Accordingly, the unevenness in the density of welding periods in each welding point group is reduced, so that the speed of the overall welding operation can be increased.

Specifically, a value indicating the unevenness in the density with respect to intervals between welding periods set on a path of a certain welding point group is calculated (step S24). For example, the density of welding periods may be determined for each small segment having a fixed length on the path, and the unevenness in the density of the welding periods may be calculated based on variations in the determined density. Then, an evaluation value is calculated such that a higher score is obtained as the unevenness in the density decreases (step S25).

Subsequently, it is determined whether or not the evaluation value for each welding point group is larger than or equal to a predetermined threshold value (step S26). If there is a group with an evaluation value smaller than the predetermined threshold value, the grouping is performed again such that the evaluation value for the group becomes higher, and the process from step S21 is repeated.

If the evaluation values for all the welding point groups are larger than or equal to the threshold value, the process proceeds to step S27. With such a looping process, the grouping of the welding points can be optimized. In this optimization looping process, for example, a genetic algorithm may be used.

In step S27, the order of shifting between the welding point groups and the order of the welding points within each welding point group are optimized. It is assumed here that the grouping has been completed and the paths have been set, as shown at the left side of FIG. 12, in accordance with the process performed up to step S26.

Figure 12:
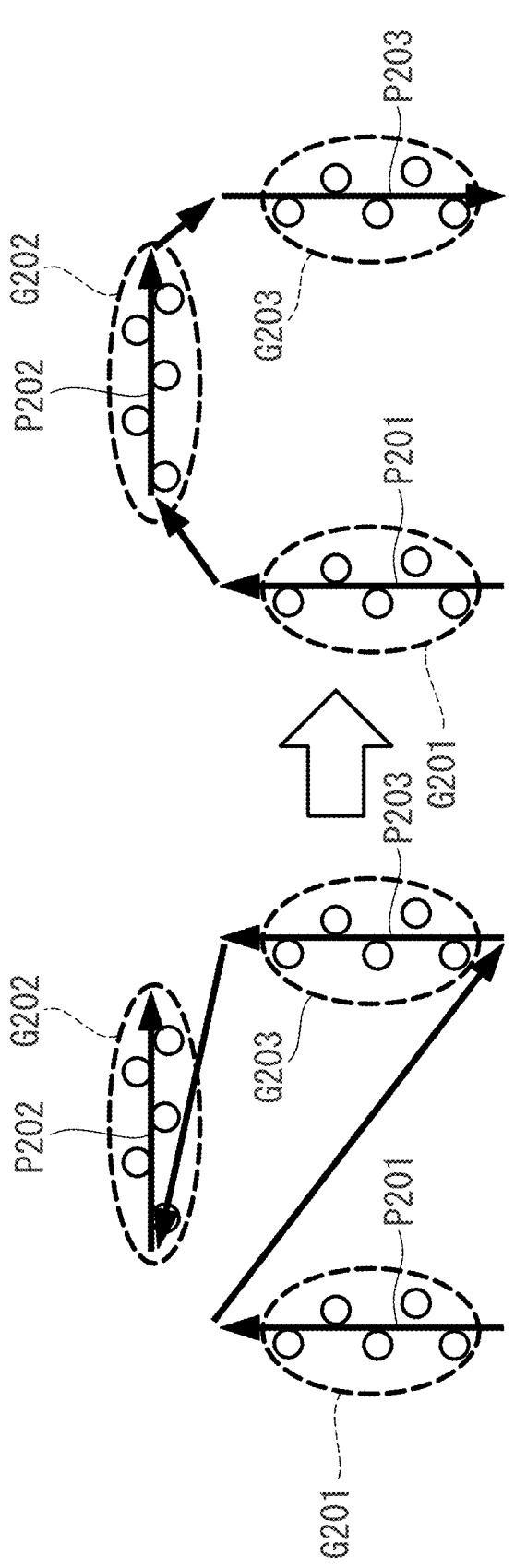
FIG. 12 is a diagram for explaining how the order of shifting between groups is optimized.

In the example shown at the left side of FIG. 12, a welding point group to be welded is grouped into three groups, namely, welding point groups G201 to G203, and paths P201 to P203 are respectively set for the welding point groups G201 to G203. The movement directions on the paths P201 to P203 set for the welding point groups G201 to G203 and the order of shifting between the welding point groups G201 to G203 are optimized (step S27). In FIG. 12, the left side shows a state prior to the optimization, whereas the right side shows a state after the optimization. In the state prior to the optimization, the order of the welding point groups G201 to G203 is as follows: welding point group G201→welding point group G203→welding point group G202.

The order of the welding points is set from the lower side toward the upper side in the figure for the welding point group G201, the order of the welding points is set from the lower side toward the upper side in the figure for the welding point group G203, and the order of the welding points is set from the left side toward the right side in the figure for the welding point group G202. It is recognizable that there is room for improvement in the state prior to the optimization since the total shifting distance between the welding point groups G201 to G203 is long.

In the state after the optimization shown at the right side of FIG. 12, the order of shifting between the welding point groups G201 to G203 is as follows: welding point group G201→welding point group G202→welding point group G203. The order of the welding points is set from the lower side toward the upper side for the welding point group G201, the order of the welding points is set from the left side toward the right side for the welding point group G202, and the order of the welding points is set from the upper side toward the lower side for the welding point group G203.

It is recognizable that the total shifting distance between the welding point groups in the state after the optimization is at a minimum. A technique that can be used for setting the order of shifting that minimizes the total shifting distance between the welding point groups may be any of various techniques known in this technical field for solving the so-called traveling salesman problem. As a result of the above process, the welding-point-group setting process (step S12) in the flowchart in FIG. 4 is completed.

Next, in step S13 in the flowchart in FIG. 4, the operating speed of the robot 10 is set for each welding point group.

Figure 6:
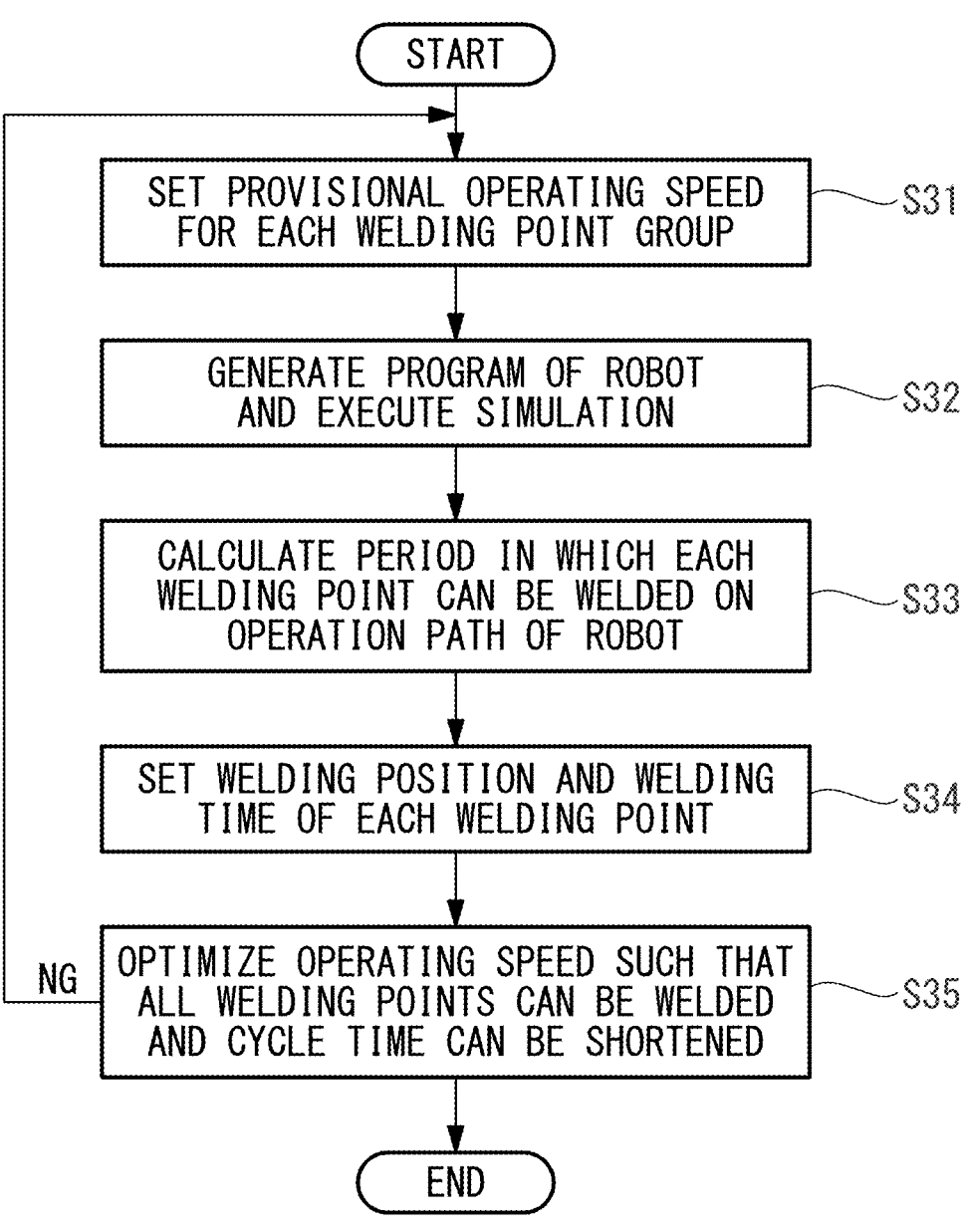
FIG. 6 is a flowchart illustrating an operating-speed setting process in the flowchart in FIG. 4.

FIG. 6 is a flowchart illustrating this operating-speed setting process in detail. First, a provisional operating speed is set for each welding point group (step S31).

With regard to the provisional operating speed, a low speed at which the welding points in each welding point group can be conceivably welded without any problems may be uniformly set for all the welding point groups. Alternatively, a representative speed based on an empirical value may be uniformly set for each welding point group.

Subsequently, an operation program of the robot 10 is generated by using the path of the robot 10 set in step S12 in the flowchart in FIG. 4 and the operating speed for each welding point group set in step S31, and an operation simulation of the robot 10 is executed (step S32). As a result of executing the operation simulation, positional data (also referred to as "operation path" hereinafter) of the robot 10 is acquired for each interpolation cycle.

Figure 13:
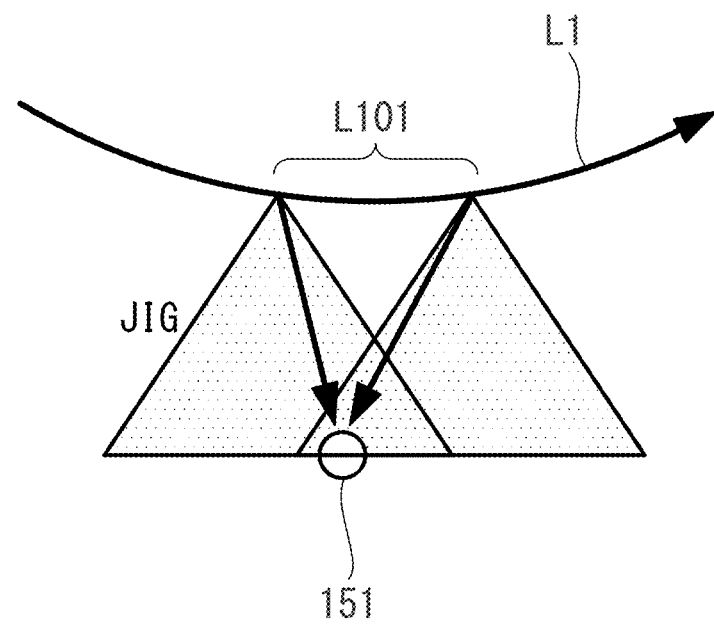
FIG. 13 is a diagram for explaining how a weldable time frame is set.

Then, by using the operation path of the robot 10 obtained as a result of the operation simulation of the robot 10, a time frame (referred to as "weldable time frame" hereinafter) corresponding to a range in which each welding point can be welded on the operation path of the robot 10 is calculated (step S33). The following description of an example of a process where a weldable time frame in which a welding point 151 can be welded is determined with respect to an operation path L1 of the robot 10, as shown in FIG. 13.

First, the position of the machining head 50 (specifically, for example, the position of the focusing lens 53 within the machining head 50) attached to the distal end of the arm of the robot 10 is determined based on a position on the operation path L1 of the robot 10, and a laser-beam path connecting the position of the machining head 50 and the position of the welding point 151 is determined.

In this case, it is determined that welding is possible with respect to this laser-beam path when the following conditions are satisfied:

(1) the laser-beam path does not interfere with the workpiece W and the jig;

(2) the laser-beam path is within the operating range of the machining head 50; and (3) an irradiation angle serving as an angle formed between the normal direction of the workpiece W and the laser beam at each welding point is within a predetermined permissible range.

The aforementioned condition (3) is applied for maintaining weld quality by avoiding the occurrence of variations in the irradiation intensity of the laser beam on the workpiece W, and also for preventing an adverse effect caused by reflected light. A time frame corresponding to a range in which it is determined that the laser-beam path is weldable consecutively on the operation path L1 is the weldable time frame for each welding point determined in step S33.

In the example in FIG. 13, reference sign L101 denotes the weldable time frame. A case where weldable time frames are set at a plurality of locations on the operation path L1 is also possible. Since the weldable time frame L101 needs to be longer than or equal to the welding period of a target welding point, a range in which this is not satisfied is excluded.

In this case, since the minimum value $\theta_{min,P}$ and the maximum value $\theta_{max,P}$ of the irradiation angle are input for each welding point, a case where the irradiation angle does not satisfy the condition where it is within the range larger than or equal to the minimum value $\theta_{min,P}$ and smaller than the maximum value $\theta_{max,P}$ is excluded from the weldable time frame L101. Specifically, as shown in FIG. 14, a laser beam is not to be radiated onto a shaded region (i.e., hollow region) where the irradiation angle is smaller than or equal to the minimum value $\theta_{min,P}$.

Figure 14:
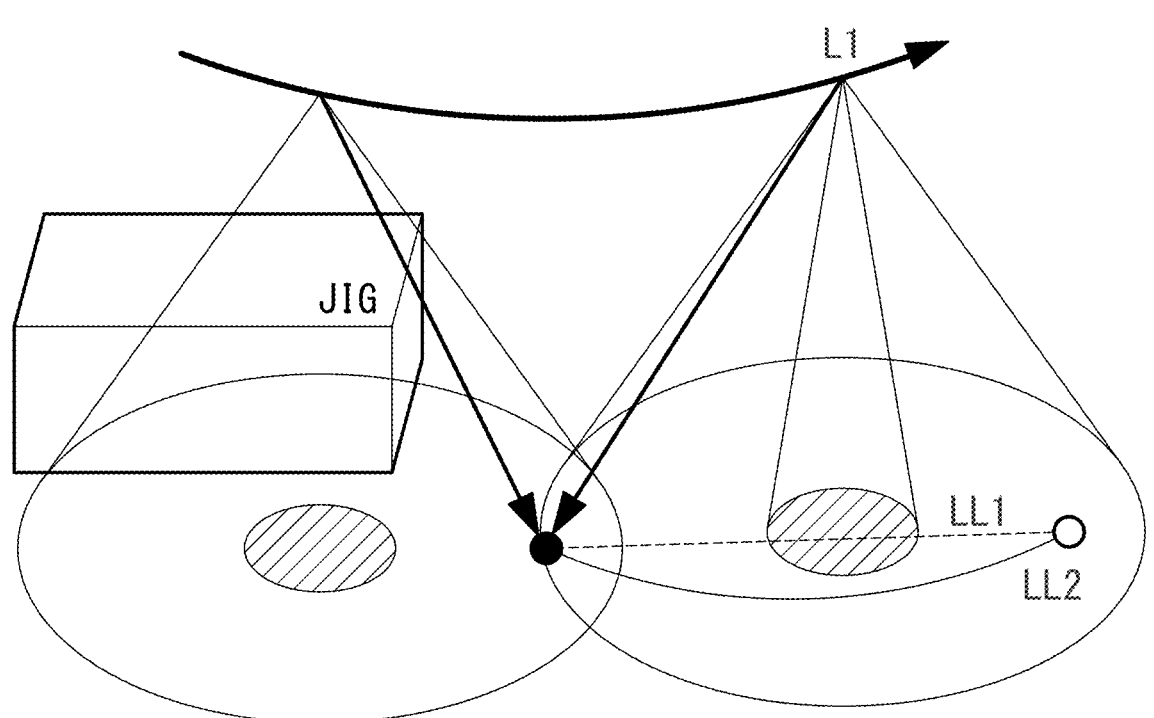
FIG. 14 is a diagram for explaining the weldable time frame and a minimum value of an irradiation angle.

Therefore, while the robot 10 moves along the operation path L1, if a laser beam is to be radiated onto a path LL1 extending through the hollow region, the weldable time frame is interrupted, as indicated with a dashed line in FIG. 14. However, as indicated with a solid line in FIG. 14, the machining head 50 is controlled such that a laser beam is radiated along a path LL2 that extends around the hollow region, so that the weldable time frame can be continued, thereby ensuring a weldable time frame that satisfies the welding period.

Subsequently, the welding position and the welding time of each welding point are set by using the weldable time frame set for each welding point in step S33 (step S34). In this case, as a first condition, the welding time is set in view of the welding period of each welding point such that the welding period of each welding point is reliably satisfied without being dependent on whether it comes before or after the starting time point of the weldable time frame of each welding point.

For example, it is assumed that there are two welding points A and B with the same welding period of 1 second, the weldable time frame of the welding point A extends from a 1-second point to a 4-second point from the start of the operation, and the weldable time frame of the welding point B extends from a 1.1-second point to a 2.1-second point from the start of the operation. In this case, although the welding point A is weldable first, the welding point B becomes non-weldable if the welding point A is welded between the 1-second point and the 2-second point. In such a case, in step S34, the welding point B is welded between the 1.1-second point and the 2.1-second point, and the welding point B is welded between the 2.1-second point and the 3.1-second point.

Figure 15:
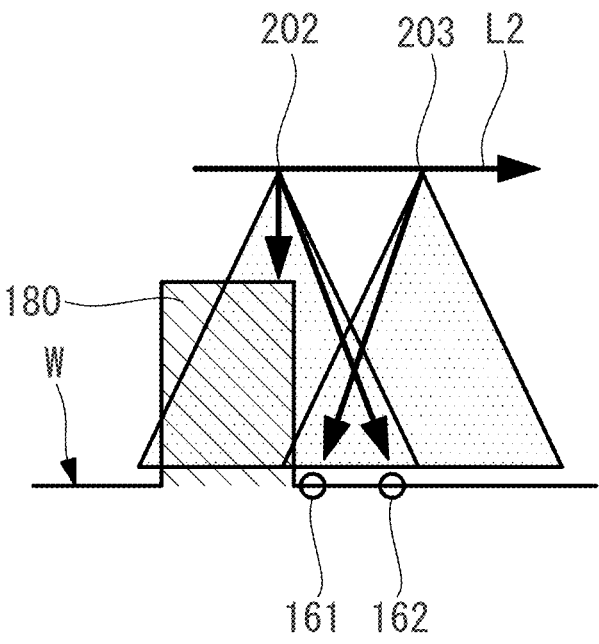
FIG. 15 is a diagram for explaining how the order of welding points is set.

Furthermore, in step S34, as a second condition, if there is a welding point that is weldable first due to the positional relationship between the operation path and the workpiece W or the jig without being dependent on the order in which the welding points are arranged, the welding point is preferentially welded. For example, as shown in FIG. 15, the order in which welding points are arranged along an operation path L2 is as follows: welding point 161→welding point 162. However, when the direction of the welding points is viewed from the operation path L2, there may be a case where the welding point 161 is hidden behind a protrusion 180 of the workpiece W such that the welding point 162 becomes weldable first. In this case, the welding point 161 is welded first at a position 202 on the operation path L2, and the welding point 162 is welded at a position 203 that comes after the position 202.

Then, the operating speed is adjusted and optimized such that all the welding points can be welded and the cycle time can be shortened (step S35). One conceivable method involves reducing the operating speed of the robot 10 to the same value for all the welding point groups until all the welding points become weldable, and subsequently increasing the operating speed for each welding point group. When the optimization is performed in accordance with the above process, the operating-speed setting process (step S13) in the flowchart in FIG. 4 ends. If the optimization is not performed, the process from step S31 is repeated.

Subsequently, an operation program of the robot 10 and an operation program of the machining head 50 are generated by using the result obtained in accordance with step S11 to step S13 described above (step S14). The operation program of the robot 10 is generated such that the robot 10 operates at the operating speed set in step S13 along the path set for all the welding point groups in step S2.

The operation program of the machining head 50 is generated as an operation command group that defines the position and the orientation of the machining head 50 such that each welding point is irradiated with the laser beam over the welding period set for the welding point when the robot 10 moves along the operation path in accordance with the operation program thereof.

Accordingly, an optimal operation path of the robot 10 and an optimal timing for welding each welding point can be automatically set.

Subsequently, the processor 40 transmits the operation program generated in this manner to the controller 20, sets the intensity $I_T$ of the laser beam to be output from the machining head 50 to a permissible value $I_{RO}$ or smaller, and causes the controller 20 to execute the operation program (step S2). For example, the permissible value $I_{RO}$ is set to an intensity that does not cause the workpiece W to be welded even when the surface of the workpiece W is irradiated with the laser beam and that does not have an adverse effect on the machining head 50 even when specularly reflected light at the surface of the workpiece W enters the machining head 50.

When the operation program is being executed, the optical sensor provided in the machining head 50 monitors the intensity $I_R$ of the reflected light (step S4), and the processor determines whether or not the intensity $I_R$ of the reflected light has exceeded the predetermined threshold value Th (step S5).

For example, the threshold value Th is calculated in accordance with Expression (1) indicated below.

$$Th \leq I_{RO} \times I_T / I_S \qquad (1)$$

In this case, $I_S$ denotes the intensity of the laser beam used in the actual laser machining, and $I_T$ denotes the intensity of the laser beam output from the machining head 50 during the teaching process.

Specifically, the threshold value Th is set such that the ratio of the intensity $I_R$ of the reflected light to the intensity $I_T$ of the laser beam output from the machining head 50 during the teaching process is smaller than or equal to the ratio of the permissible reflected-light intensity $I_{RO}$ to the intensity $I_S$ of the laser beam used in the actual laser machining.

If the intensity $I_R$ of the reflected light exceeds the threshold value Th, the minimum value $\theta_{min,P}$ of the irradiation angle at the corresponding welding point is increased by a predetermined increment $\Delta\theta$ (step S6), and the detection of the reflected light is stopped to wait until the welding period of the corresponding welding point P ends (step S7). After the welding period of the welding point P ends, the process proceeds to deal with the next welding point P+1 (step S8), and the process from step S4 is repeated until the operation program ends (step S9).

If the intensity of the reflected light is smaller than or equal to the threshold value Th, the process from step S4 is repeated until the operation program ends (step S9). After the operation program ends, it is determined whether or not the intensity $I_R$ of the reflected light is smaller than or equal to the predetermined threshold value Th at all the welding points (step S10). If the intensity $I_R$ of the reflected light has exceeded the threshold value Th at any of the welding points, the process from step S1 is repeated. If the intensity $I_R$ of the reflected light is smaller than or equal to the predetermined threshold value Th at all the welding points in step S10, an ultimate operation program is output (step S10A).

Accordingly, this embodiment is advantageous in that the reflected light of the laser beam at the surface of the workpiece W does not have an adverse effect on the machining head 50, all the welding points to be welded are weldable, and the operating speed can be set to minimize the cycle time.

Specifically, depending on the material of the workpiece W or the state of the surface of the workpiece W, the intensity $I_R$ of the reflected light returning to the machining head 50 varies even when the intensity $I_S$ of the laser beam to be emitted is fixed. This embodiment is advantageous in that, since the minimum value $\theta_{min,P}$ of the irradiation angle that reduces the intensity $I_R$ of the reflected light to the intensity $I_{RO}$ or lower for each welding point over the entire operation program is automatically determined, the operation program does not need to be manually adjusted by an operator.

Furthermore, unlike a method that reduces the intensity $I_R$ of the reflected light over the entire operation program by setting the initial value $\theta_{min}$ for the minimum value $\theta_{min,P}$ of the irradiation angle of each welding point P to a large value in advance, the smallest minimum value $\theta_{min,P}$ that reduces the intensity $I_R$ of the reflected light to the permissible reflected-light intensity $I_{RO}$ can be obtained, so that the irradiation angle range does not need to be excessively limited. This is advantageous in that a desired cycle time of laser machining can be readily achieved.

As an alternative to this embodiment in which the initial value $\theta_{min}$ for the minimum value $\theta_{min,P}$ of the irradiation angle of the laser beam is set to zero, the initial value $\theta_{min}$ may be set to a value other than zero. For example, in a case where the workpiece W to be welded has a mirror-like surface, there may be a case where reflected light obviously exceeding the permissible reflected-light intensity $I_{RO}$ undesirably enters the machining head 50 if the minimum value $\theta_{min,P}$ of the irradiation angle is zero. In such a case, setting the initial value $\theta_{min}$ for the minimum value $\theta_{min,P}$ to a value other zero can eliminate one or more unnecessary initial processes, thereby shortening the time it takes to search for an appropriate minimum value.

Furthermore, as an alternative to this embodiment in which the robot 10 is a vertical articulated type robot, another type of a robot may be used. Moreover, a laser scanning device other than the galvano scanner 51 may be used.

As an alternative to this embodiment in which laser welding is described as an example of laser machining, the embodiment may be applied to another freely-chosen type of laser machining.

The invention claimed is:

1. A teaching system for laser machining, the teaching system teaching an operation of a robot equipped with a machining head that outputs a laser beam and an operation of the machining head, the teaching system comprising:
   a sensor that detects an intensity of reflected light of the laser beam returning to the machining head from a surface of an object to be machined; and
   at least one processor,
   wherein the at least one processor is configured to
   receive inputs of a minimum value and a maximum value of an irradiation angle serving as an angle formed between a normal to the surface of the object to be machined at each of machining points and the laser beam output from the machining head, and coordinates of the machining points, and perform a generation of teaching data that enables laser machining at all the machining points by using the laser beam having the irradiation angle larger than or equal to the minimum value and smaller than the maximum value, perform a determination of whether or not intensities of the reflected light detected by the sensor at all the machining points include an intensity exceeding a predetermined threshold value when a controller of the robot executes an operation program including the teaching data by using the laser beam set to an intensity at which the intensity of the reflected light when the irradiation angle is set to the minimum value is smaller than or equal to a permissible value, in response to determining that the reflected light having the intensity exceeding the threshold value exists, perform an adjustment to increase the minimum value at a corresponding machining point by a predetermined increment, and repeat the generation of the teaching data using a most-recently adjusted minimum value, the determination, and the adjustment of the minimum value until determining that the reflected light having the intensity exceeding the threshold value does not exist.

2. The teaching system according to claim 1, wherein a first version of the teaching data is generated by setting the minimum value to zero.

3. The teaching system according to claim 1, wherein a first version of the teaching data is generated by setting the minimum value to a value other than zero.

4. A teaching method for laser machining, the teaching method including teaching an operation of a robot equipped with a machining head that outputs a laser beam and an operation of the machining head, the teaching method comprising:

inputting a minimum value and a maximum value of an irradiation angle serving as an angle formed between a normal to a surface of an object to be machined at each of machining points and the laser beam output from the machining head, and coordinates of the machining points and performing a generation of teaching data that enables laser machining at all the machining points by using the laser beam having the irradiation angle larger than or equal to the minimum value and smaller than the maximum value;

performing a determination of whether or not intensities of reflected light of the laser beam returning to the machining head from the surface of the object to be machined at all the machining points include an intensity exceeding a predetermined threshold value when a controller of the robot executes an operation program including the teaching data by using the laser beam set to an intensity at which the intensity of the reflected light of the laser beam returning to the machining head from the surface of the object to be machined when the irradiation angle is set to the minimum value is smaller than or equal to a permissible value;

in response to determining that the reflected light having the intensity exceeding the threshold value exists, performing an adjustment to increase the minimum value at a corresponding machining point by a predetermined increment; and repeating the generation of the teaching data using a most-recently adjusted minimum value, the determination, and the adjustment of the minimum value until determining that the reflected light having the intensity exceeding the threshold value does not exist.

* * * * *